(12) United States Patent
Saliba (10) Patent No.: US 7,395,983 B1
(45) Date of Patent: Jul. 8, 2008

(54) TAPE CARTRIDGE FOR TESTING AND REPAIRING A TAPE HEAD OF A TYPE DRIVE

(75) Inventor: George A. Saliba, Boulder, CO (US)

(73) Assignee: Quantrum Corporation, San Jose, CA (US)

( * ) Notice: Subject to any disclaimer, the term of this patent is extended or adjusted under 35 U.S.C. 154(b) by 0 days.

(21) Appl. No.: 11/786,909

(22) Filed: Apr. 13, 2007

Related U.S. Application Data (63) Continuation of application No. 11/729,617, filed on Mar. 28, 2007.

(51) Int. Cl.
*G11B 23/107* (2006.01)

(52) U.S. Cl. ........................................ 242/348; 360/132

(58) Field of Classification Search .............. 242/332.1, 242/332.4, 532.1, 348, 348.2, 348.3; 360/132, 360/134
See application file for complete search history.

(56) References Cited

U.S. PATENT DOCUMENTS

| | | | | |
|---|---|---|---|---|
| 3,293,682 | A | * 12/1966 | Giles | ........................ 242/332.4 |
| 3,931,643 | A | 1/1976 | Kuroe | |
| 4,724,484 | A | * 2/1988 | Ward | |
| 4,893,209 | A | * 1/1990 | Siddiq | |
| 5,332,173 | A | * 7/1994 | Kubota et al. | ................ 360/134 |
| 5,513,815 | A | * 5/1996 | Erickson et al. | |
| 5,638,236 | A | * 6/1997 | Scott | |
| 5,936,816 | A | * 8/1999 | Bloomquist et al. | |
| 6,798,617 | B2 | 9/2004 | Misawa | |
| 6,914,748 | B2 | 7/2005 | Rathweg | |
| 7,099,103 | B2 * | 8/2006 | Stewart et al. | |
| 2003/0155460 | A1 * | 8/2003 | Hiraguchi | |
| 2004/0159733 | A1 * | 8/2004 | Sato et al. | ..................... 242/348 |
| 2006/0032959 | A1 * | 2/2006 | Hiraguchi et al. | ......... 242/332.4 |

\* cited by examiner

*Primary Examiner*—William A Rivera
(74) *Attorney, Agent, or Firm*—Roeder & Broder LLP; James P. Broder (57) ABSTRACT

A tape cartridge (54) for use in a tape drive (46) having a tape head (260) includes a cartridge housing (272), a cartridge reel (274) and a tape (278). The cartridge reel (274) is rotatably secured to the cartridge housing (272). The tape (278) is secured to the cartridge reel (274). The tape (278) can include a storage tape (278D) that stores data and a lapping tape (278L) that laps the tape head (260). In one embodiment, the storage tape (278D) and the lapping tape (278L) are spliced together. The ratio of storage tape (278D) to lapping tape (278L) can be at least approximately 0.01:1. The lapping tape (278L) can include a diamond material having a grit of between approximately 0.1 micron and 1.0 micron. In one embodiment, the tape (578) can include a first lapping tape (578L1) and a second lapping tape (578L2) that has a different grit than the first lapping tape (578L1). In another embodiment, the tape (678) also includes a cleaning tape (678CL) that cleans the tape head (260).

24 Claims, 5 Drawing Sheets

TAPE CARTRIDGE FOR TESTING AND REPAIRING A TAPE HEAD OF A TYPE DRIVE

CROSS-REFERENCE TO RELATED APPLICATION

The present application is a continuation application and claims the benefit on co-pending U.S. patent application Ser. No. 11/729,617, filed on Mar. 28, 2007. To the extent permitted, the contents of U.S. patent application Ser. No. 11/729,617 are incorporated herein by reference.

BACKGROUND

Tape cartridges can store a vast amount of data. Tape drives, used either singly or in a tape library (also referred to as a media library), each include a data transducer or head (such as a magnetoresistive (MR) head) that reads and/or writes data to the tape cartridges. For proper operation of the tape drive, the head must maintain very close proximity to the storage tape of the tape cartridge in order to provide the ability to record and reproduce signals. The head operates in an open environment and can be exposed to various contaminants from the open air and/or from the storage tape itself. Today's heads require very low separation between the head and the storage tape for greater accuracy in reading and writing of data. Excessive separation between the head and the storage tape and/or sensor damage such as scratches, nicks or other abrasions to the head itself can result in reading and writing errors or even head failure.

It is well known that tape to head separation increases when contaminants build up on the surface of the head. Cleaning cartridges or brushes can be used to remove contaminants. Unfortunately, these types of cleaning devices can be relatively ineffective for removing hardened deposits on the head. Further, when the sensor of the head is impacted with sufficient force, or when a conductive material causes a short in an element in the head, the head is rendered unusable and the drive must be repaired. In addition, contaminants and tape abrasive materials can generate surface scratches that effectively create permanent separation between the tape and the sensor that also reduces the head signal, requiring repair to the head.

Presently, the drive repair process can be lengthy, complex and costly. For example, when a tape drive fails within a media library, the drive must be shipped back to the factory where it undergoes a screening process that attempts to identify the drive or drives having failed heads. Drives with suspect heads are disassembled and heads are carefully removed. Failed heads are returned to head vendors for repair. The head repair procedure can be proprietary to each head vendor, further complicating the entire process. Typically, the head repair includes lapping of the head, followed by testing. This "lap and test" procedure is repeated until a satisfactory result is achieved, or until the head is deemed irreparable. The head is then sent back to be installed into a rebuilt drive, and after a complete retest, the rebuilt drive is returned so that it can be reinstalled for the customer.

SUMMARY

The present invention is directed toward a tape cartridge for use in a tape drive having a tape head. In one embodiment, the tape cartridge includes a cartridge housing, a cartridge reel and a tape. The reel is rotatably secured to the cartridge housing. The tape is secured to the reel. In certain embodiments, the tape includes a storage tape that stores data and a lapping tape that laps the tape head. In one embodiment, the storage tape and the lapping tape are spliced together. The ratio of storage tape to lapping tape can be at least approximately 0.01:1. The lapping tape can include a diamond material having a grit of between approximately 0.1 micron and 1.0 micron. In one embodiment, the tape can include a first lapping tape and a second lapping tape that has a different grit than the first lapping tape. In another embodiment, the tape includes a cleaning tape that cleans the tape head. The cleaning tape can be spliced to one of the lapping tape and the storage tape.

The present invention is also directed toward a tape library that includes a tape drive and at least one of the tape cartridges.

The present invention is also directed toward a method for manufacturing a tape cartridge.

BRIEF DESCRIPTION OF THE DRAWINGS

The invention, together with further advantages thereof, may best be understood by reference to the following description taken in conjunction with the accompanying drawings, taken in conjunction with the accompanying description, in which similar reference characters refer to similar parts, and in which.

DESCRIPTION

Figure 1:
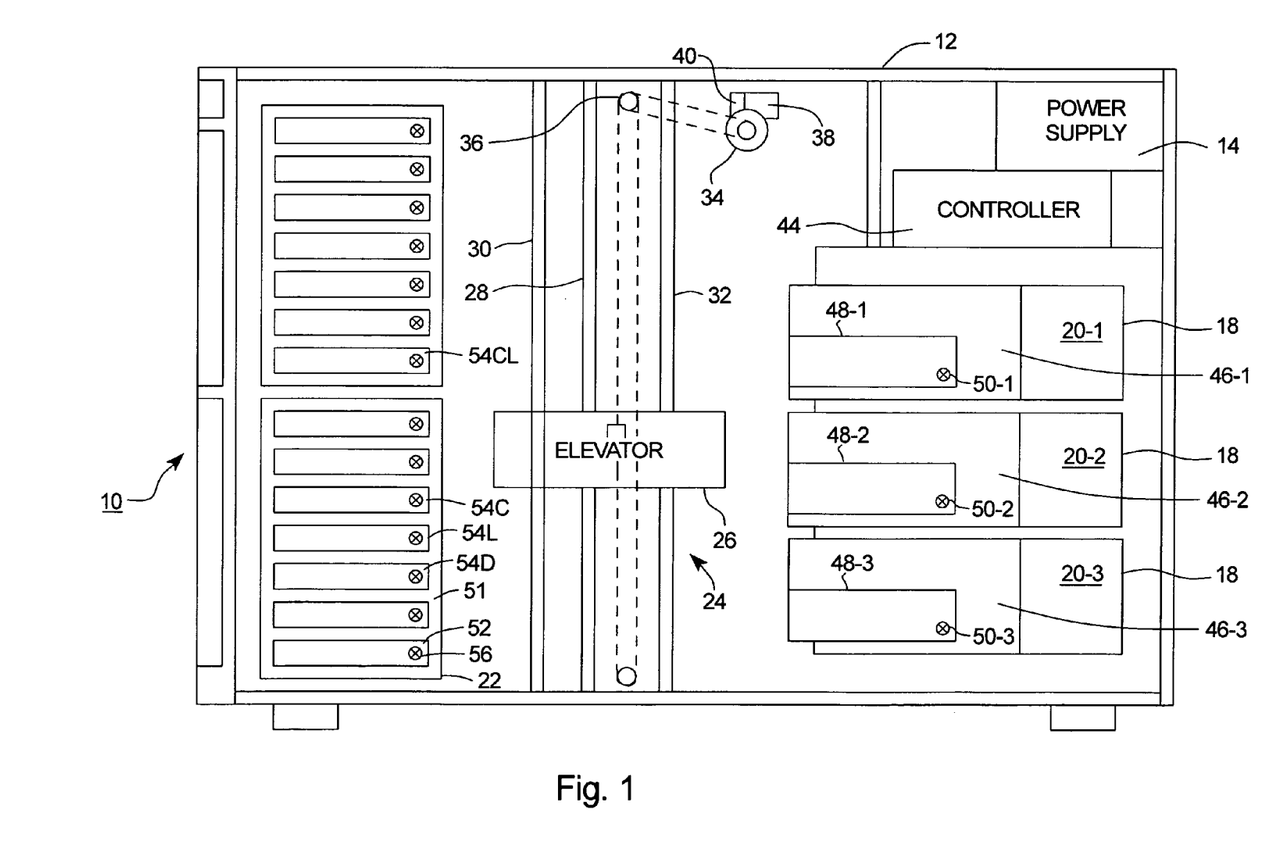
FIG. 1 is a block diagram of one embodiment of a media library having features of the present invention including a plurality of tape drives and a plurality of tape cartridges.

FIG. 1 is a simplified schematic view of one embodiment of a media library 10, in the form of a multi-drive, mass storage and retrieval tape library/loader unit. In one embodiment, the media library 10 includes a housing 12, a power supply 14, a plurality of drive assembly receivers 18, a plurality of tape drive assemblies 20-1, 20-2, 20-3 (also sometimes generically referred to herein as tape drive assemblies 20), one or more cartridge retainer receivers 22, a cartridge mover 24 including a cartridge pass-through and/or rotating elevator 26, at least one cartridge elevator guide shaft 28, a drive shaft 30, a rack drive shaft 32, a cartridge elevator motor 34, a pulley drive assembly 36, a roller drive shaft motor 38 and a rack drive shaft motor 40. The housing 12 may be constructed of any number and/or type of conventional materials such as, for example, those utilized in industry standard rack mount cabinets. It is recognized that many different suitable types of cartridge movers 24 can be utilized in the media library 10, and that the cartridge mover 24 provided herein is merely representative of one such type and is not intended to limit the scope of the present invention in any manner.

In this embodiment, the power supply 14 can provide electrical power to the plurality of drive assembly receivers 18, one or more of the tape drive assemblies 20, the cartridge elevator motor 34, the roller drive shaft motor 38, and/or the rack drive shaft motor 40. The power supply 14 is interfaced with these components as well as with an external power source using industry standard cabling and connections (not shown).

Each of the drive assembly receivers 18 receives one of the tape drive assemblies 20. As provided herein, each of the tape drive assemblies 20 can include a corresponding tape drive 46-1, 46-2, 46-3 (i.e. Quantum DLT 2000XT™, DLT4000™, DLT7000™, DLT8000™, DLT VS80™, DLT VS160™, DLT V4™, DLT S4™, SDLT 320™, SDLT 600™, LTO-2™, LTO-2 HH™, LTO-3™, LTO-3 HH™, DAT 72™, DDS-4™, or equivalent, as non-exclusive examples).

The tape drive assemblies 20-1, 20-2, 20-3 within the media library 10 can be substantially identical to one another. Alternatively, one or more of the tape drive assemblies 20-1, 20-2, 20-3 within the media library 10 can be different from the remaining tape drive assemblies 20-1, 20-2, 20-3 in the media library 10. The tape drive assemblies 20 include one or more controllers 44 (one controller 44 is illustrated in FIG. 1). In one embodiment, each tape drive assembly 20-1, 20-2, 20-3 includes a separate controller 44. Alternatively, the tape drive assemblies 20-1, 20-2, 20-3 can share a single controller 44.

Each tape drive 46-1, 46-2, 46-3 (generically referred to as tape drive 46) includes a cartridge receiver 48-1, 48-2, 48-3 (generically referred to as receiver 48) and a corresponding cartridge sensor 50-1, 50-2, 50-3 (generically referred to as sensor 50) within the cartridge receiver 48. The cartridge receiver 48 receives one of a plurality of cartridges 54D, 54L, 54C (generically referred to as cartridge 54), which are adapted for use in the media library 10. The cartridge sensor 50 can generate a cartridge presence signal when the cartridge 54 is present within the cartridge receiver 48 of the tape drive 46. This signal from one tape drive 46 can be provided to the controller 44 and/or to another tape drive 46 in the same media library 10 or in a different media library 10.

Each of the cartridge retainer receivers 22 can receive a standard cartridge retainer 51, such as a tape magazine in one non-exclusive example, which includes a plurality of cartridge receivers 52. The cartridge retainer 51 includes a cartridge presence indicator 56 within each cartridge receiver 52 which indicates the presence and/or absence of a cartridge 54 within the cartridge receiver 52.

In the embodiment illustrated in FIG. 1, the cartridge mover 24 is positioned within the housing 12 between the plurality of cartridge receivers 52 and the plurality of cartridge retainer receivers 22. In this manner, the cartridge mover 24 is able to load and unload one of the cartridges 54 to and from all of the tape drives 46 and cartridge retainers 51 within a given media library 10. Further, the input of one or more cartridges 54 into the cartridge receiver 52 of one or more tape drives 46 can be automated, or it can be manually undertaken by an operator, for example.

In the embodiment illustrated in FIG. 1, the controller 44 is physically positioned remotely from the tape drives 46. In an alternative embodiment, the controller 44 is incorporated into one or more of the tape drives 46. For example, the controller 44 can physically reside within or on one or more of the tape drives 46.

In one embodiment, the controller 44 can include a standard driver interface unit for receiving digital commands and translating the commands into driving currents, such as step pulses for controlling stepper motors. Further, the controller 44 can include a standard programmable general purpose computer formed on a single plug-in card unit and preferably includes a programmed microprocessor or microcontroller according to the present invention, memory, communication interface, control interface, connectors, etc. The controller 44 can form part or all of the drive circuitry, which can include or comprise a printed circuit board assembly (not shown), in one non-exclusive example.

The media library 10 can use well-known industry standard cabling and communication protocols between the controller 44 and other components of the media library 10. Cabling and electrical characteristics including signaling protocols can be generally standardized, and the logical message protocols can be either proprietary or standardized as known to those skilled in the art.

Additionally, as set forth in greater detail below, the controller 44 can determine whether a problem with one or more tape drives 46 may be occurring. For example, the controller 44 can monitor the reading and/or writing error rate of the tape drive 46 to determine if this error rate is above a predetermined threshold. If so, the controller 44 can take certain steps to mitigate or reduce the error rate, as described below. Alternatively, the controller 44 can monitor other performance parameters to determine whether a performance problem may exist with one or more of the tape drives 46.

Various non-exclusive examples of performance parameters include the controller 44 monitoring an output of the tape drive 46, a resolution of a signal from the tape drive 46, an error rate in reading of data from the cartridge 54, an error rate in writing of data to the cartridge 54, and/or a signal-to-noise ratio (S/N ratio) of the tape drive 46. The controller 44 can determine whether these or other suitable parameters are above or below a predetermined threshold level for each parameter, at which point the controller 44 can selectively initiate corrective action in accordance one or more embodiments described herein. In certain embodiments, the controller can use an algorithm that is based on one or more of the above performance parameters to determine whether corrective action is required for the tape drive, as more fully described below. In an alternative embodiment, the tape drive's own drive circuitry can provide one or more of the above-referenced functions provided by the controller 44.

The types of cartridges 54 in the media library 10 can vary. For example, the cartridges 54 can include one or more data cartridges 54D, one or more lapping cartridges 54L and/or one or more combination cartridges 54C. The data cartridge 54D includes a magnetic storage tape that is adapted to store data. The lapping cartridge 54L includes lapping tape that is adapted to perform a lapping operation on a portion of the tape drive 46. The combination cartridge 54C includes both the storage tape and the lapping tape, as described in greater detail below.

Any number of each type of cartridge 54 can be present within the media library 10 to satisfy the design requirements of the media library 10. In certain embodiments, all three types of cartridges 54D, 54L, 54C are present. Alternatively, one or more of these types of cartridges 54D, 54L, 54C may be absent from the media library 10. Still alternatively, the media library can also include other types of cartridges, such as a cleaning cartridge 54CL that includes a cleaning tape for cleaning dust or other particulates from portions of the tape drive 46. In another embodiment, the cleaning tape can also be included as part of the combination cartridge 54C.

In one embodiment, two of more different types of cartridges 54D, 54L, 54C generally have a substantially similar form factor. In another embodiment, the form factor for two or more of the cartridges 54D, 54L, 54C can be different.

Figure 2:
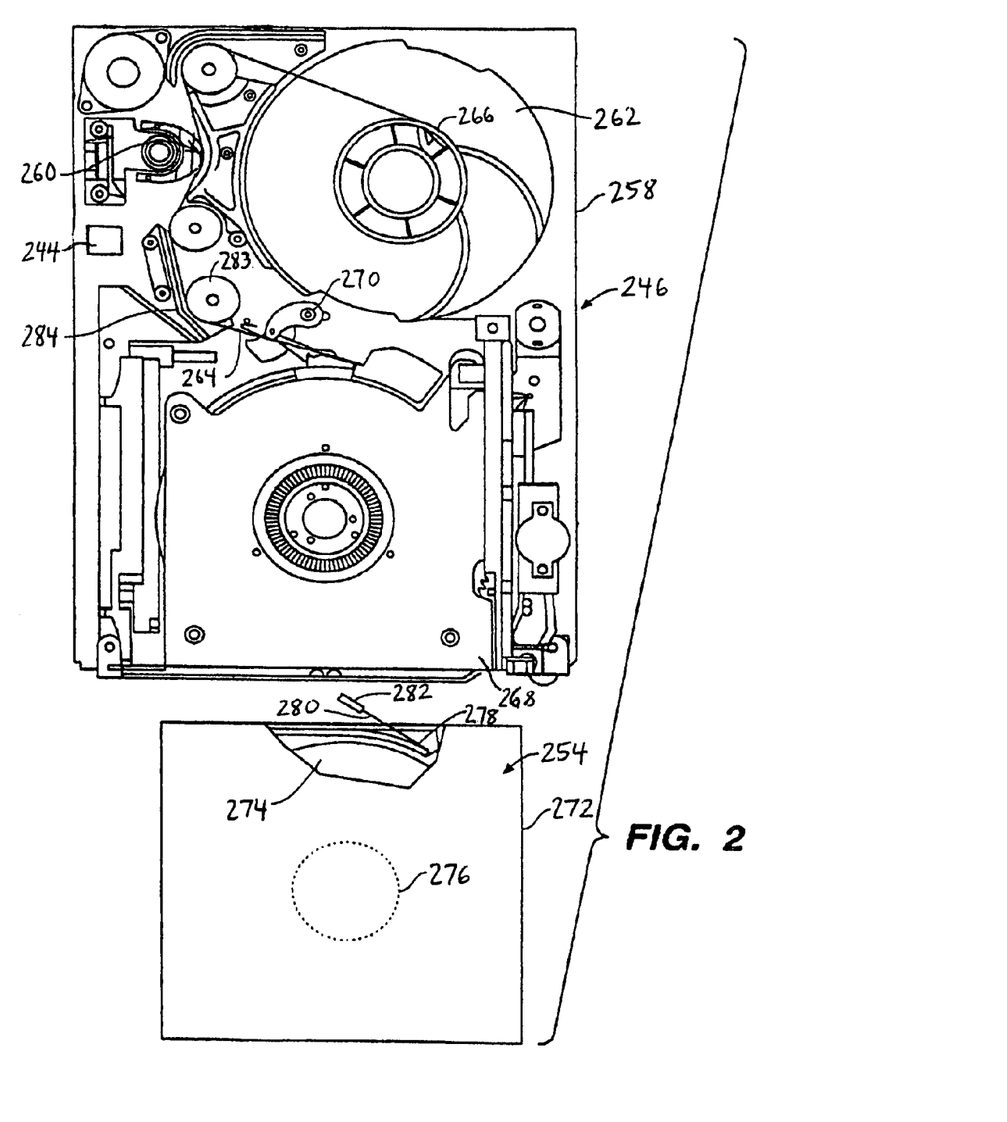
FIG. 2 is a top view of a portion of one embodiment of the tape drive and the tape cartridge.

FIG. 2 illustrates one embodiment of a cartridge 254 and the tape drive assembly 220, which includes one tape drive 246. It is recognized that the tape drive assembly 220 described herein can be part of the media library 10 as illustrated in FIG. 1, or the tape drive assembly 220 can be a stand-alone type of assembly.

In the embodiment illustrated in FIG. 2, the tape drive 246 includes a drive housing 258, a tape head 260, a take-up reel 262 having a drive leader 264 and a take-up reel hub 266, a cartridge receiver 268, a buckler 270 and the controller 244. In one embodiment, the cartridge 254 includes a cartridge housing 272, a cartridge reel 274 having a cartridge hub 276 (shown in phantom), a tape 278, and a cartridge leader 280 having a cartridge buckle component 282. The buckler 270 secures the drive leader 264 to the cartridge leader 280. The buckler 270 moves the drive leader 264 relative to the cartridge leader 280 to automatically buckle and/or unbuckle the drive leader 264 to the cartridge leader 280 in ways known to those skilled in the art. Further, the specific type of buckler 270 included in the tape drive assembly 220 can include any type of device that secures the drive leader 264 to the cartridge leader 280, and can be varied in ways known to those skilled in the art.

The drive housing 258 retains the various components of the tape drive 246, including at least the tape head 260 and the cartridge receiver 268. In the embodiment illustrated in FIG. 2, the tape drive 246 further includes a plurality of tape rollers 283 and tape guides 284 which are coupled or directly secured to the drive housing 258. The tape rollers 283 and tape guides 284 guide the tape 278 along a tape path across the tape head 260 and onto the take-up reel 262. In one embodiment, the tape drive 246 includes three tape rollers 283 and two tape guides 284. However, any suitable number of tape rollers 283 and/or tape guides 284 can be included in the tape drive 246.

The tape 278 is secured to the cartridge hub 276 on one end and the cartridge leader 280 on the other end. As illustrated in FIG. 2, the cartridge 254 includes a single cartridge reel 274. In an alternate embodiment (not shown), the cartridge 254 can include two or more cartridge reels 274.

In this embodiment, the tape drive 246 also includes a take-up reel motor (not shown) that rotates the take-up reel 262, and a cartridge reel motor (not shown) that rotates the cartridge reel 274. The rotational force of the take-up reel motor relative to the cartridge reel motor determines the tension of the tape 278 moving across the tape head 260. In certain embodiments, the controller 244 dynamically controls the rotational force of the take-up reel motor and the cartridge reel motor to dynamically control the tension of the tape 278 relative to the tape head 260. In alternative embodiments, the tension of the tape 278 can also or alternatively be controlled by the controller 244 in other suitable ways, such as by controlled movement of the tape head 260 toward and/or away from the tape 278, or vice versa.

In one embodiment, the tape 278 of one of the cartridges 254 includes a storage tape only, which magnetically stores data in digital form. In another embodiment, the tape 278 of one of the cartridges 254 includes a lapping tape only, which includes a relatively abrasive material such as 0.5 micron diamond tape that can inhibit severe induced shorts, and reduce or remove scratches and other imperfections, persistent deposits and other particulates or contaminants from the tape head 260. In still another embodiment, the tape 278 in one of the cartridges 254 can include a combination of at least two different types of tape, such as the storage tape and the lapping tape, as one non-exclusive example. It is recognized that the combination of different tapes within a single cartridge 254 can also include other suitable types of tape that can vary depending upon the design requirements of the tape drive 246, such as a cleaning tape as one non-exclusive example.

Figure 3:
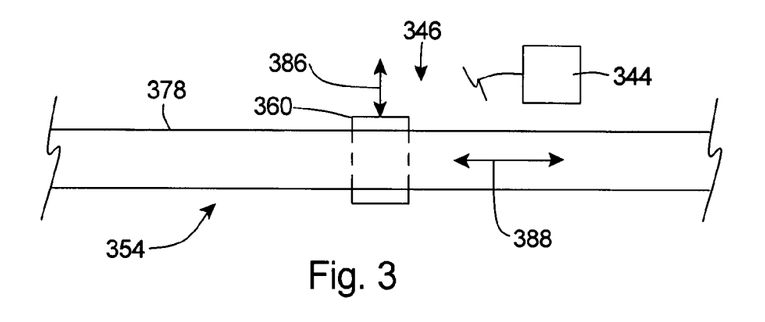
FIG. 3 is a side view of a portion of one embodiment of the tape drive including a tape head and a controller, and a portion of the tape cartridge including the tape.

FIG. 3 is a side view of one embodiment of a portion of the tape drive 346 including the tape head 360 and the controller 344, and a portion of the cartridge 354 including section of a tape 378. In this embodiment, the controller 344 controls movement of the tape head 360 in an up and down oscillating manner, as indicated by arrow 386. More specifically, the controller 344 can control the frequency and/or amplitude of oscillation of the tape head 360 relative to the tape 386. In an alternative embodiment, the controller 344 can control movement of the tape head 360 in a direction that is different than strictly an up and down movement. For example, in non-exclusive alternative embodiments, the controller 344 can control movement of the tape head 360 in a diagonal, lateral, circular or an elliptical motion.

The controller 344 can also control the lateral velocity, direction of movement (indicated by arrow 388), and/or duration of movement of the tape 378 across the tape head 360. In one embodiment, the controller 344 can coordinate the frequency of oscillation of the tape head 360, the lateral velocity of the tape 378, the direction of movement of the tape 378 and/or the duration of movement of the tape 378 in order to mitigate or correct one or more of the problems of the tape drive 346 identified herein.

The controller 344 can control the frequency of oscillation of the tape head 360, the lateral velocity of the tape 378, the tension of the tape 378 and/or duration of movement of the tape 378 across the tape head 360 using one or more algorithms. In some embodiments, the algorithms can be based on monitoring, improving and/or optimizing the results from one or more of an output of the tape head, a resolution of a signal from the tape head, an error rate in reading of data by the tape head from the storage tape, an error rate in writing of data by the tape head to the storage tape, and a signal-to-noise ratio from the tape head, or any other suitable parameter.

Figure 4:
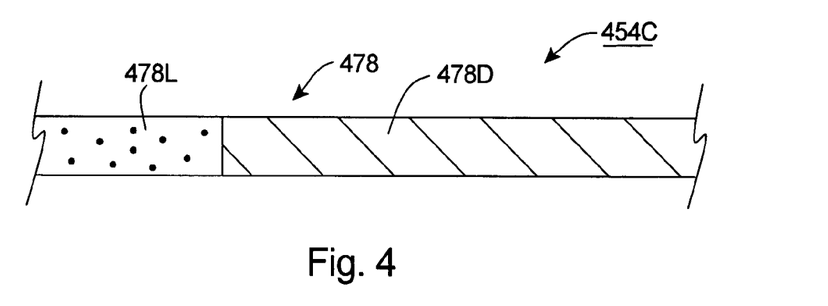
FIG. 4 is a side view of a portion of one embodiment of a tape of the tape cartridge.

FIG. 4 is a side view of a portion of one embodiment of the tape 478 of a combination cartridge 454C. In this embodiment, the tape 478 includes a magnetic storage tape 478D for storing data and a lapping tape 478L for lapping the tape head 360 (illustrated in FIG. 3). In one embodiment, the storage tape 478D in the cartridge 454C is used for testing purposes only, to determine the performance level of the tape head 360 of the tape drive 346 (illustrated in FIG. 3). For example, if the controller 344 (illustrated in FIG. 3) detects a problem with the tape drive 346, the controller 344 can initiate a lapping operation during which the lapping tape 478L is moved across the tape head 360 in an attempt to resolve the problem. Following the lapping operation, the tape head 360 can be tested by performing a read and/or write operation relative to the storage tape 478D, without the need for removing the cartridge 454C that is presently in the tape drive 346. In an alternative embodiment, the storage tape 478D can be used both for testing the tape drive 346 as well as for actual storage of real data being used by the user of the tape drive 346.

The proportion of the total length of the tape 478 that is storage tape 478D versus lapping tape 478L can vary depending upon the design requirements of the tape drive assembly 20 and/or the media library 10. In one embodiment, the tape 478 can be substantially equally divided between storage tape 478D and lapping tape 478L. Alternatively, the ratio of storage tape 478D to lapping tape 478L can be at least approximately 0.01, 0.1, 0.5, 0.75, 0.9, 1.1, 1.25, 1.5, 2.0, 5.0, 10.0 or 100.0. Still alternatively, the ratio can be above or below the foregoing range.

The specific design of the lapping tape 478L can vary to suit the design requirements of the tape drive assembly 20 and/or the media library 10. In one embodiment, the lapping tape 478L can include an abrasive material such as a 0.1 micron diamond material. In non-exclusive alternative embodiments, the lapping tape 478L can include a 0.5 micron or a 1.0 micron diamond material. Still alternatively, the size of the diamond material can be larger or smaller than these examples. Further, the abrasive material can be formed from another suitable element or compound, provided the requisite level of lapping of the tape head 360 can be achieved.

The length of the lapping tape 478 can likewise be varied. In one embodiment, the length of the lapping tape 478 can be approximately 20 feet. Alternatively, the length can be less than or greater than this length.

The storage tape 478D and the lapping tape 478L can be spliced together in a similar manner that other types of magnetic recording tapes are spliced together, i.e. in a manner known to those skilled in the art. Further, the storage tape 478D and/or the lapping tape 478L can each be uninterruptedly positioned within the cartridge 454C, or the storage tape 478D and/or the lapping tape 478L can alternate, e.g., be intermittently or alternatingly positioned within the cartridge 454C.

The tension of the lapping tape 478L can be controlled by the controller 344 (illustrated in FIG. 3) using an algorithm for adjusting the tension of the tape 478, which can be based on one or more of the pliability of the tape 478, the curvature or other geometry of the tape head 360 (illustrated in FIG. 3), and/or the grit of the lapping tape 478L, as non-exclusive examples.

Figure 5:
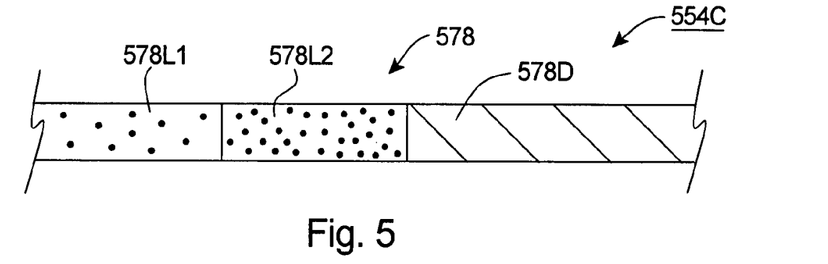
FIG. 5 is a side view of a portion of another embodiment of the tape of the tape cartridge.

FIG. 5 is a side view of a portion of another embodiment of the tape 578 of a combination cartridge 554C. In this embodiment, the tape 578 includes a magnetic storage tape 578D for storing data, a first lapping tape 578L1 and a second lapping tape 578L2. In one embodiment, the first lapping tape 578L1 can be substantially similar to the lapping tape previously described herein. The second lapping tape 578L2 can have a different grit than the first lapping tape 578L1. For example, the second lapping tape 578L2 can be more or less abrasive than the first lapping tape 578L1. In addition, or in the alternative, the second lapping tape 578L2 can include a different type of material, i.e. a different element or compound for lapping the tape head 360 (illustrated in FIG. 3) than the first lapping tape 578L1.

In the embodiment illustrated in FIG. 5, the first lapping tape 578L1 and the second lapping tape 578L2 are positioned adjacent to one another. In an alternative embodiment, the first lapping tape 578L1 and the second lapping tape 578L2 are separated by the storage tape 578D, or by another type of tape.

Figure 6:
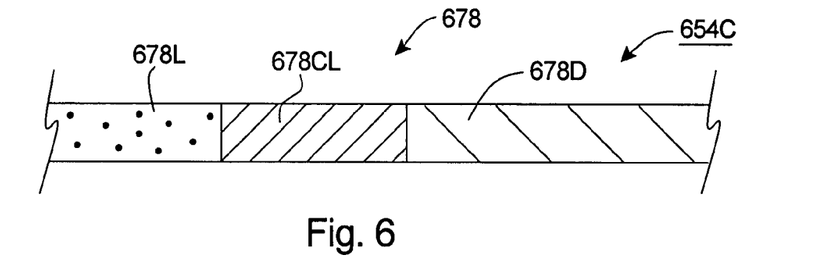
FIG. 6 is a side view of a portion of yet another embodiment of the tape of the tape cartridge.

FIG. 6 is a side view of a portion of another embodiment of the tape 678 of a combination cartridge 654C. In this embodiment, the tape 678 includes a magnetic storage tape 678D for storing data, a lapping tape 678L and a cleaning tape 678CL that is positioned between the storage tape 678D and the lapping tape 678L. Alternatively, the relative positions of the tapes 678D, 678L, 678CL can be different than that illustrated in FIG. 6. The cleaning tape 678CL can be a relatively nonabrasive type of tape known to those skilled in the art, which can remove dust and or other loose particulates that can be present on the tape head 360 (illustrated in FIG. 3). The cleaning tape 678CL be formed from a material such as that used in Quantum Cleaning Cartridges THXHC-02 DLT™, DLT-1 VS80™, and/or DLT VS160™, as various non-exclusive examples, although any suitable cleaning tape 678CL can be utilized in the cartridge 654C.

Figure 7:
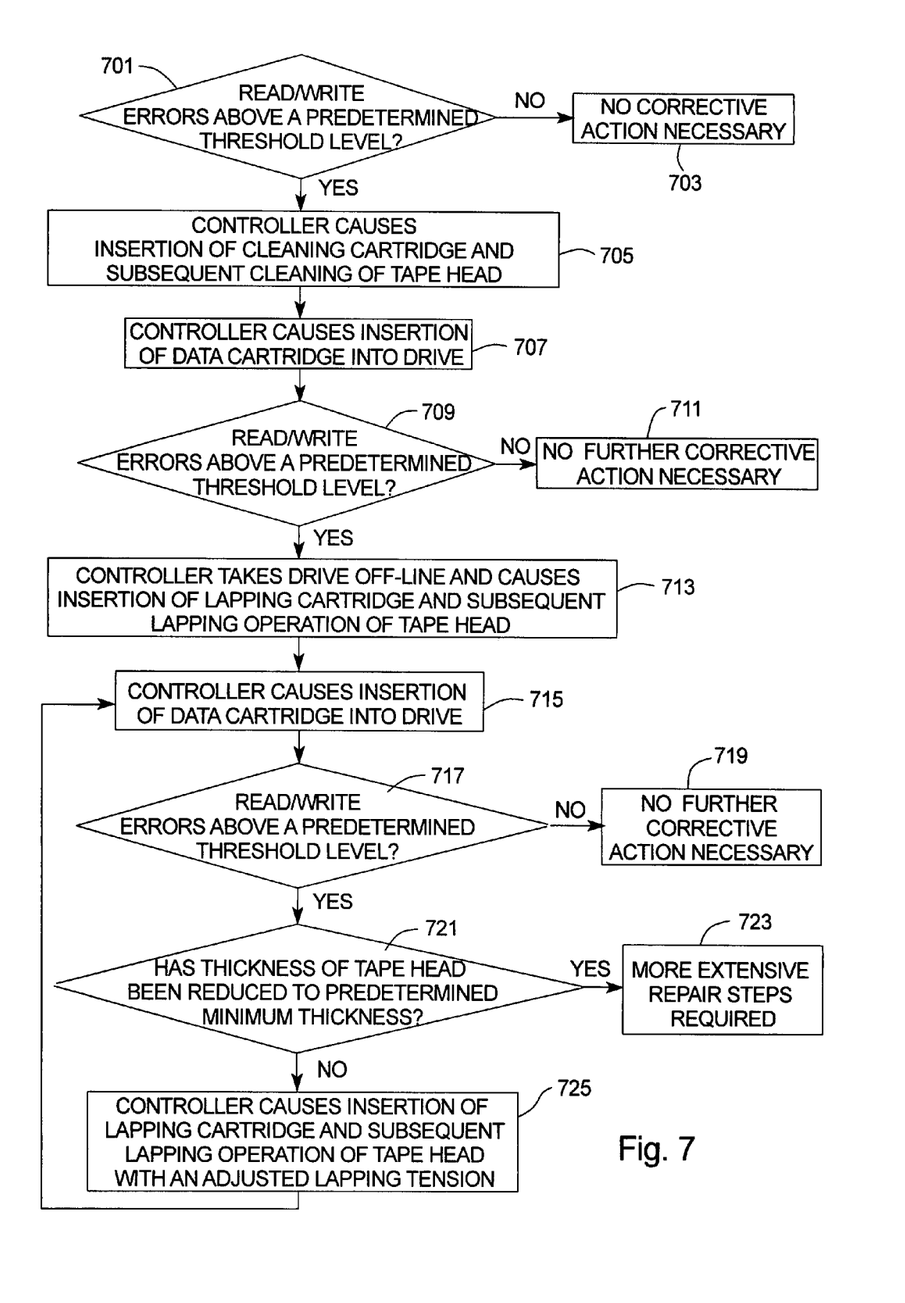
FIG. 7 is a flow diagram illustrating one embodiment of a method for repairing the tape drive in accordance with the present invention.

FIG. 7 is a flow diagram illustrating one embodiment of a method for repairing the tape drive in accordance with the present invention. In this embodiment, during normal operation of the tape drive, the controller determines whether read/write errors above a predetermined threshold level are occurring on a standard data cartridge (step 701).

It is recognized that although FIG. 7 refers to "read/write errors", this can be mean either read errors or write errors, or a combination of read and write errors. In addition or in the alternative, the controller can equally monitor other types of errors or performance characteristics of the tape drive to determine whether a predetermined threshold has been surpassed (either too high or too low). No limitations on the types of errors or performance characteristics of the tape drive that can be monitored by the controller are intended by simply referring to "read/write errors" in FIG. 7. Further, the predetermined threshold can be included as part of the firmware or drive circuitry of the tape drive and/or media library, or it can be manually input by an operator as required.

If the predetermined threshold is not exceeded, no corrective action is required (step 703). If the predetermined threshold of read/write errors is exceeded, the controller can initiate insertion of a cleaning cartridge into the tape drive, and subsequent cleaning of the tape head (step 705).

Once cleaning of the tape head has concluded, the controller can initiate reinsertion of the data cartridge (step 707). The controller then monitors the read/write errors to determine if they are still above the predetermined threshold (step 709). If not, no further corrective action is necessary (step 711). However, if the read/write errors are determined by the controller to exceed the predetermined threshold, the controller can take the tape drive off-line (such as in a media library setting) and can initiate insertion of a lapping cartridge and a subsequent lapping operation of the tape head (step 713).

Once the lapping operation has concluded, the controller can initiate reinsertion of the data cartridge into the tape drive (step 715). The controller can then monitor read/write errors to determine whether they exceed the predetermined threshold level (step 717). If not, no further corrective action is necessary (step 719). However, if the read/write errors exceed the predetermined threshold level, the controller can determine based on changes of various parameters such as amplitude, resolution, signal-to-noise ration, etc., whether the tension of the lapping tape used in the most recent lapping operation must be increased or reduced in order to achieve improved or optimum contact between the tape head and the storage tape (step 721). Alternatively, the controller may determine that no adjustment of the tension is required. The predetermined optimum contact between the lapping tape and the tape head can be achieved by following one of the known cursive methods of adjustment and can be preset by the operator or it can be programmed into the firmware of the tape drive.

The lapping process reduces the thickness of the sensor of the tape head by removing material from the sensing element. If the most recent lapping operation caused the sensor to reach a predetermined minimum thickness by monitoring the maximum allowable resistance or out of range bias current level, the tape drive must be serviced more extensively than by the present invention (step 723), such as by the manufacturer or another service technician, i.e. replacing the tape head at the factory. In one embodiment, the controller can alert the manufacturer, service technician or another designated person to initiate the repair process. Further, the lapping service life is reduced with repeated usage of the lapping tape. If the predetermined maximum lifespan of the lapping tape is reached during the most recent lapping operation as determined by lack of lapping effectiveness of removing material as measured by the parameters, the controller can insert a new lapping cartridge and repeat the lapping operation. The normal steps of repair include modifying the tension of the lapping tape in incremental increasing or reducing steps until the tape head performance is restored to an acceptable level (step 725) as required by the design requirements of the tape drive, the tape drive assembly or the media library.

Following the lapping operation at the required and/or optimum tension, the controller initiates reinsertion of the data cartridge (step 715), and the process repeats until the read/write errors no longer exceed the predetermined threshold level (steps 717 and 719), or until the tape head thickness has reached the predetermined minimum (steps 721 and 723).

It is recognized that although FIG. 7 describes the "predetermined maximum" relative to lapping tension, this predetermined maximum can equally refer to frequency of oscillation of the tape head, lateral velocity of the lapping tape across the tape head, or any combination of lapping tension, frequency of oscillation of the tape head and/or lateral velocity of the lapping tape across the tape head.

Figure 8:
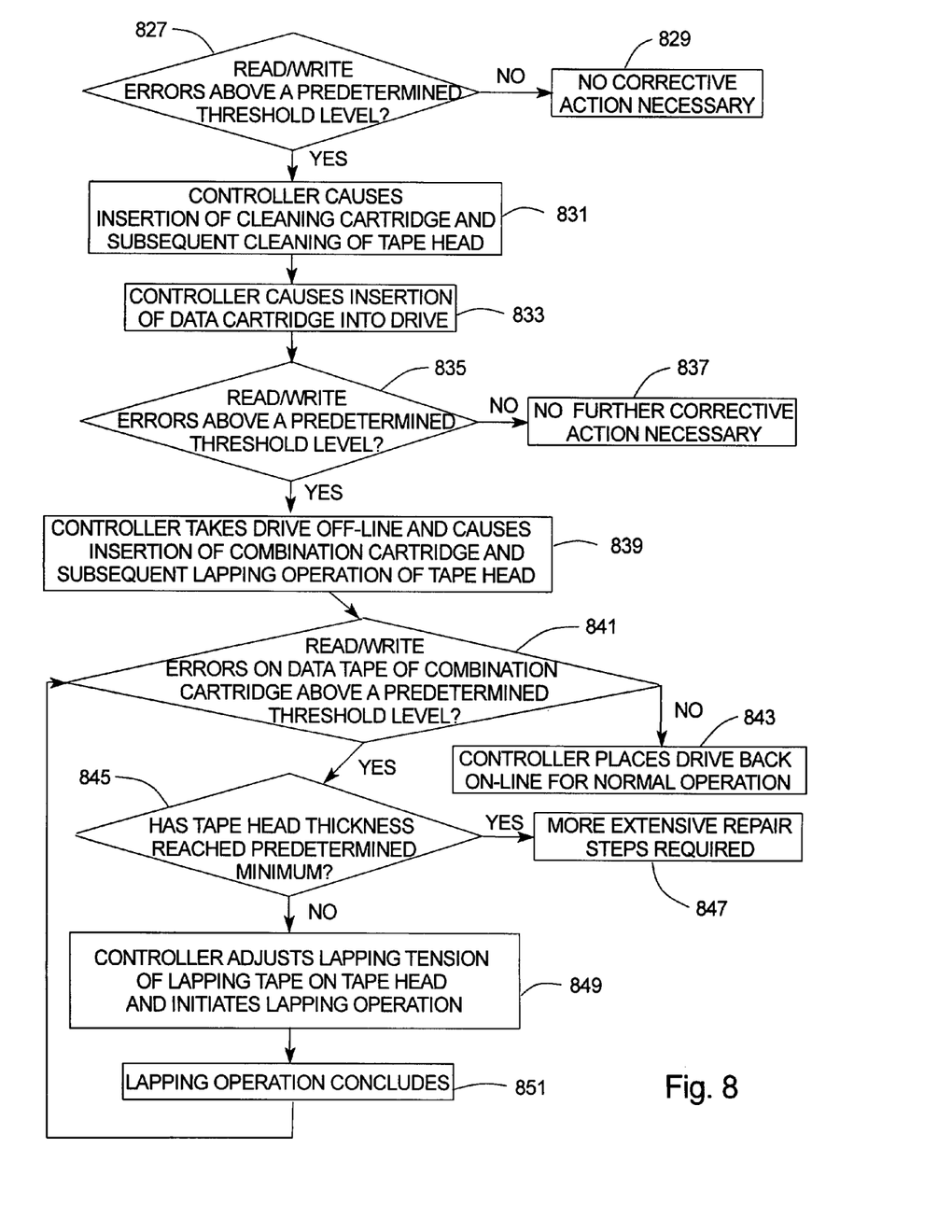
FIG. 8 is a flow diagram illustrating another embodiment of a method for repairing the tape drive in accordance with the present invention.

FIG. 8 is a flow diagram illustrating another embodiment of a method for repairing the tape drive in accordance with the present invention. In this embodiment, during normal operation of the tape drive, the controller determines whether read/write errors above a predetermined threshold level are occurring on a standard data cartridge (step 827).

It is recognized that although FIG. 8 refers to "read/write errors", this can be mean either read errors or write errors, or a combination of read and write errors. In addition or in the alternative, the controller can equally monitor other types of errors or performance characteristics of the tape drive to determine whether a predetermined threshold has been surpassed (either too high or too low). No limitations on the types of errors or performance characteristics of the tape drive that can be monitored by the controller are intended by simply referring to "read/write errors" in FIG. 8.

If the predetermined threshold is not exceeded, no corrective action is required (step 829). If the predetermined threshold of read/write errors is exceeded, the controller can initiate insertion of a cleaning cartridge into the tape drive, and subsequent cleaning of the tape head (step 831).

Once cleaning of the tape head has concluded, the controller can initiate reinsertion of the data cartridge (step 833). The controller then monitors the read/write errors to determine if they are still above the predetermined threshold (step 835). If not, no further corrective action is necessary (step 837). However, if the read/write errors are determined by the controller to exceed the predetermined threshold, the controller can take the tape drive off-line (such as in a media library setting) and can initiate insertion of a combination storage tape and lapping tape cartridge and a subsequent lapping operation of the tape head (step 839).

Once the lapping operation has concluded, the controller can then monitor read/write errors relative to the storage tape of the same cartridge to determine whether they exceed the predetermined threshold level (step 841). If not, no further corrective action is necessary and the controller can place the tape drive back on-line for normal operation (step 843). However, if the read/write errors exceed the predetermined threshold level, the controller can determine whether the tension of the lapping tape used in the most recent lapping operation was higher or lower than the optimum level (or some other acceptable level) by comparing the most recent lapping test results (step 845), and whether the tension of the lapping tape should be adjusted.

If the MR resistance or bias current of the lapping tape in the most recent lapping operation has reached a predetermined maximum level, the tape drive must be serviced more extensively than by the present invention (step 847), such as by the manufacturer or another service technician. In one embodiment, the controller can alert the manufacturer, service technician or another designated person to initiate the repair process. If the predetermined MR resistance or bias current of the tape head had not yet been reached during the most recent lapping operation, e.g., the thickness of the sensor of the tape head is not at or below a predetermined minimum thickness, the controller can repeat the lapping operation with an adjusted tension of the lapping tape (step 849), i.e. higher or lower tension, as described previously. Alternatively, it may be determined that the tension does not need to be adjusted. In this embodiment, the lapping operation can be performed again at substantially the same tension but for a longer duration, as one non-exclusive example.

Upon conclusion of the lapping operation (step 851), the controller can monitor read/write errors relative to the storage tape of the same cartridge to determine whether they exceed the predetermined threshold level (step 841). This process repeats until the read/write errors no longer exceed the predetermined threshold level (steps 841 and 843), or until the tape head thickness has reached the predetermined minimum (steps 845 and 847).

Similar to the description of FIG. 7 above, it is recognized that although FIG. 8 describes the "predetermined maximum" MR resistance or bias current, this predetermined maximum can equally refer to frequency of oscillation of the tape head, lateral velocity of the lapping tape across the tape head, or any combination of lapping tension, frequency of oscillation of the tape head and/or lateral velocity of the lapping tape across the tape head or the number of lapping operations a particular tape head has undergone.

Furthermore, this remote repair operation can be applied to determine the need and apply remote corrective non-intrusive traditional drive repair such as updating the micro code of the tape drive and any other suitable tape drive settings prior to restoring the tape drive to an on-line status.

While the particular tape cartridge 54 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A tape cartridge for use in a tape drive having a tape head, the tape cartridge comprising:
    a cartridge housing;
    a cartridge reel that is rotatably secured to the cartridge housing; and
    a tape that is secured to the cartridge reel, the tape including a storage tape to which data is transmitted from the tape drive and a lapping tape that laps the tape head.

2. The tape cartridge of claim 1 wherein the storage tape and the lapping tape are spliced together.

3. The tape cartridge of claim 1 wherein the ratio of storage tape to lapping tape is at least approximately 0.01:1.

4. The tape cartridge of claim 1 wherein the tape includes a first lapping tape and a second lapping tape that has a different grit than the first lapping tape.

5. The tape cartridge of claim 1 wherein the tape includes a cleaning tape that cleans the tape head.

6. The tape cartridge of claim 5 wherein the cleaning tape is spliced to one of the lapping tape and the storage tape.

7. The tape cartridge of claim 1 wherein the lapping tape includes a diamond material having a grit of between approximately 0.1 micron and 1.0 micron.

8. A tape library including a tape drive and the tape cartridge of claim 1.

9. The tape library of claim 8 including a controller that controls insertion of the tape cartridge into the tape drive.

10. A tape cartridge for use in a tape drive having a tape head, the tape cartridge comprising:
   a cartridge housing;
   a cartridge reel that is rotatably secured to the cartridge housing; and
   a tape that is secured to the cartridge reel, the tape including a storage tape to which data is written from the tape drive, the storage tape being selectively used for testing the performance of the tape heads and a lapping tape that selectively laps the tape head.

11. The tape cartridge of claim 10 wherein the storage tape and the lapping tape are spliced together.

12. The tape cartridge of claim 10 wherein the ratio of storage tape to lapping tape is at least approximately 0.01:1.

13. The tape cartridge of claim 10 wherein the tape includes a cleaning tape that cleans the tape head.

14. The tape cartridge of claim 10 wherein the tape includes a first lapping tape and a second lapping tape that has a different grit than the first lapping tape.

15. The tape cartridge of claim 10 wherein the lapping tape includes a diamond material having a grit that is at least approximately 0.1 micron.

16. A tape library including a tape drive and the tape cartridge of claim 10.

17. The tape library of claim 16 including a controller that controls insertion of the tape cartridge into the tape drive.

18. A method for manufacturing a tape cartridge, the method comprising the step of:
   coupling a tape to a cartridge reel of the tape cartridge, the tape including a storage tape to which data is transmitted from a tape drive and a lapping tape that is adapted to lap a tape head of the tape drive.

19. The method of claim 18 further comprising the step of splicing the storage tape and the lapping tape to one another.

20. The method of claim 18 wherein the tape includes a cleaning tape that is secured to one of the storage tape and the lapping tape.

21. The method of claim 18 wherein the lapping tape includes a diamond material having a grit that is at least approximately 0.1 micron.

22. The method of claim 18 wherein the ratio of storage tape to lapping tape is at least approximately 0.01:1.

23. The method of claim 18 wherein the tape cartridge includes only one cartridge reel.

24. The method of claim 18 wherein the tape includes a first lapping tape and a second lapping tape that has a different grit than the first lapping tape.

* * * * *

UNITED STATES PATENT AND TRADEMARK OFFICE
CERTIFICATE OF CORRECTION

PATENT NO. : 7,395,983 B1 Page 1 of 1
APPLICATION NO. : 11/786909
DATED : July 8, 2008
INVENTOR(S) : George A. Saliba It is certified that error appears in the above-identified patent and that said Letters Patent is hereby corrected as shown below:

On the Title Page (54) and column 1 line 2

1 - Replace the word "TYPE" with the word -- TAPE --

On the Title Page (73)

2 - Please substitute -- Quantum Corporation -- for the assignee instead of "Quantrum Corporation"

Signed and Sealed this

Thirtieth Day of September, 2008

JON W. DUDAS
*Director of the United States Patent and Trademark Office*